Aug. 30, 1938.    H. D. BENNETT    2,128,218
RECEPTACLE FOR PRODUCTS OF THE SOIL
Filed April 16, 1935
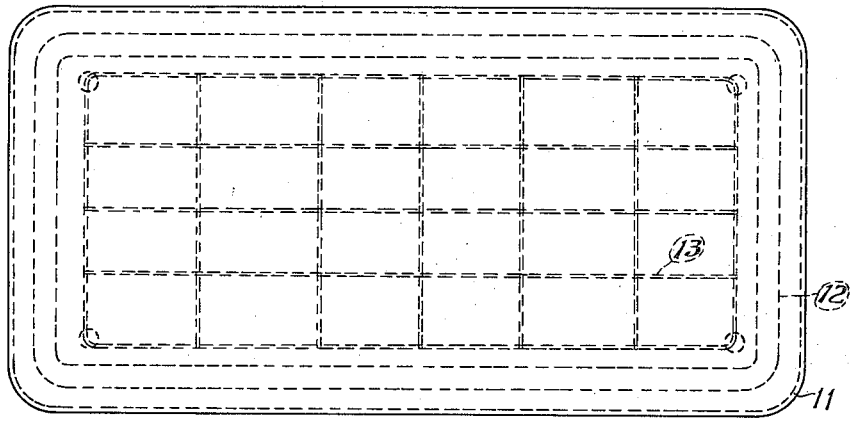
Fig. I
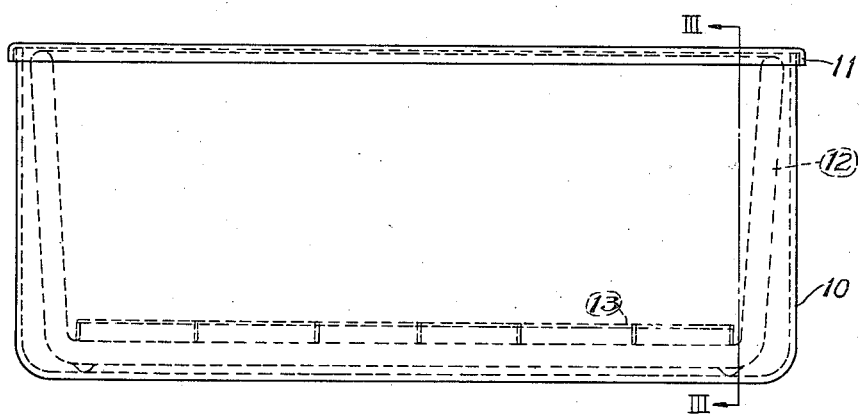
Fig. II
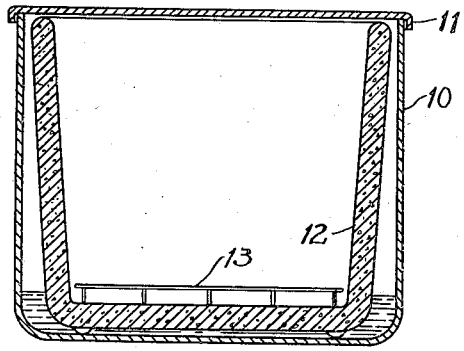
Fig. III
Hubert D. Bennett
INVENTOR
BY
ATTORNEYS.

Patented Aug. 30, 1938

2,128,218

UNITED STATES PATENT OFFICE 2,128,218

RECEPTACLE FOR PRODUCTS OF THE SOIL

Hubert D. Bennett, Toledo, Ohio, assignor to Toledo Scale Manufacturing Company, a corporation of New Jersey Application April 16, 1935, Serial No. 16,638

4 Claims. (Cl. 65—59)

Products of the soil, such as vegetables, when kept in a mechanical refrigerator, deteriorate and wilt almost as rapidly as when kept on racks exposed to the atmosphere. The water loss in twenty-four hours caused by the dehydrating action of the evaporator coils is from five to twenty-five per cent of the weight of the vegetables, so that vegetables kept in a refrigerator become spoiled in about two days.

The principal object of this invention is to provide a refrigerator receptacle for products of the soil in which they are adequately protected from rapid dehydration and deterioration.

More specific objects and advantages are apparent from the description in which reference is had to the accompanying drawing illustrating a preferred embodiment of the invention.

Figure I of the drawing is a plan of the receptacle.

Figure II is an elevation thereof.

Figure III is a vertical section taken on the line III—III of Figure II.

The specific drawing and the specific description that follows are to disclose and illustrate the invention, and are not to impose limitations upon the claims.

The outer casing 10 of the receptacle has a cover 11, which preferably fits loosely so that the receptacle is substantially but not entirely closed. The slight circulation of air thus provided may be augmented if necessary by the provision of small perforations. It is preferable to make the outer casing 10 of metal porcelain enameled or otherwise rust-proofed. Within the casing is a vapor diffusing means that preferably has a large surface area in contact with the atmosphere of the receptacle substantially encircling the storage space for the vegetables. It should also have a portion adapted to dip into a body of water disposed within the receptacle, for capillary withdrawal of the water to be diffused as vapor into the atmosphere of the receptacle.

The vapor diffuser used in the preferred embodiment is an inner receptacle 12 of suitable porous material. Although a body of water may be held by the vapor diffuser or in any other manner, it is preferable for the water to be held in the bottom of the outer casing, where it is in contact with the vapor diffusing means and out of contact with the vegetables.

If the vapor diffuser is of highly permeable material, the water level is preferably below the level of the vegetables to prevent seepage of liquid water onto them. It is also preferable for the vegetables to be held substantially out of contact with the vapor diffuser. A means for holding them spaced from the bottom of the inner receptacle 12 is sufficient, because there is no substantial contact with the side walls in the absence of direct lateral pressure such as the downward pressure exerted by the weight of the vegetables. The means shown in the drawing for holding the vegetables substantially out of contact with the inner receptacle 12 is a rack 13. Although it suffices for the rack 13 to cover merely the bottom of the receptacle, it may be extended upward on all sides to cover the sides of the receptacle if desired.

It has been found that vegetables do not keep satisfactorily in a refrigerator receptacle without a vapor diffusing means such as that shown, because of the loss of water vapor through the slight but highly essential ventilation of the receptacle, and through frequent opening for access to the contents.

Changes of form may be made and various embodiments of the substance of the invention may be constructed to meet various conditions.

Having described my invention, I claim:

1. A refrigerator receptacle for products of the soil comprising a substantially closed outer casing having its bottom and the lower portion of its walls impervious to seepage of water from inside, a porous inner receptacle adapted to rest in a body of water held by the outer casing, having space therein for storage of products of the soil, and a rack for holding products of the soil in the inner receptacle spaced from the bottom thereof.

2. A refrigerator receptacle for products of the soil comprising a substantially closed outer casing having its bottom and the lower portion of its walls impervious to seepage of water from inside, a porous vapor diffuser fitting within the outer casing, and having a large surface area relative to its volume and a smaller volume than the casing to provide space for a substantial body of water within the casing and space for storage of products of the soil, and means for supporting the products substantially out of the path of water seeping under water pressure through the porous vapor diffuser.

3. A refrigerator receptacle for products of the soil comprising a substantially closed outer casing having its bottom and the lower portion of its walls impervious to seepage of water from inside, a porous inner wall substantially encircling the interior of the receptacle, and having a smaller volume than the casing to provide space for a substantial body of water and space for products of the soil, and means for supporting the products within the encircling porous wall, out of contact with the water, and substantially out of the path of water seeping under water pressure through the porous vapor diffuser.

4. A refrigerator receptacle for products of the soil comprising a substantially closed outer casing having its bottom and the lower portion of its walls impervious to seepage of water from inside, a porous vapor diffuser fitting within the casing, and having a large surface area and a smaller volume than the casing to provide space for water and space for products of the soil, and means for holding the products above the level of a substantial body of water in contact with the porous member.

HUBERT D. BENNETT.